United States Patent [19]

Wittig

[11] Patent Number: 4,849,185
[45] Date of Patent: Jul. 18, 1989

[54] CATALYTIC CONVERTER WITH MULTIPLE REMOVABLE CATALYST PANELS

[75] Inventor: J. Michael Wittig, West Chester, Pa.
[73] Assignee: Johnson-Matthey, Inc., Malvern, Pa.
[21] Appl. No.: 923,165
[22] Filed: Oct. 24, 1986
[51] Int. Cl.$^4$ ............................................. B01D 53/36
[52] U.S. Cl. ...................................... 422/171; 34/15; 34/242; 55/483; 55/484; 422/179; 422/237; 422/238
[58] Field of Search ................................ 422/168–172, 422/177, 179, 180, 236–238; 55/481, 483, 484; 34/15, 242

[56] References Cited

U.S. PATENT DOCUMENTS

| | | | |
|---|---|---|---|
| 2,718,460 | 9/1955 | Bowen, III | 422/171 |
| 2,969,127 | 1/1961 | Cook | 55/483 |
| 3,803,813 | 4/1974 | Yuzawa | 55/481 |
| 4,110,173 | 8/1978 | Dix | 34/242 |
| 4,185,074 | 1/1980 | Yamazaki et al. | 422/177 |
| 4,193,756 | 3/1980 | Leon | 34/242 |
| 4,238,455 | 12/1980 | Ogiwara | 422/177 |
| 4,296,540 | 10/1981 | Potter | 34/242 |
| 4,353,872 | 10/1982 | Midorikawa | 422/177 |
| 4,425,191 | 1/1984 | Evans | 34/242 |
| 4,544,525 | 10/1985 | Honda et al. | 422/171 |

Primary Examiner—Barry S. Richman
Assistant Examiner—Timothy M. McMahon
Attorney, Agent, or Firm—Cushman, Darby & Cushman

[57] ABSTRACT

Apparatus for effecting high temperature catalytic conversion treatment of exhaust gases flowing in a large volume exhaust path comprising a plurality of separate catalyst panel assemblies, and a panel support assembly arranged to be mounted within the exhaust path and to separately removably support each of the plurality of catalyst panel assemblies so that high temperature exhaust gases within the exhaust path will flow therethrough in operation and each panel assembly can be conveniently serviced by simple removal. The panel support assembly includes an outer ambient temperature peripheral frame structure, an inner high temperature peripheral frame structure mounted within the outer peripheral frame structure for temperature responsive expansion and contraction with respect thereto, and an expansible and contractible high temperature resistant peripheral seal assembly between the inner and outer peripheral frame structures for maintaining a flow preventing seal therebetween. Each catalyst panel assembly is supported by an arrangement which includes doors openable to permit the catalyst panel assemblies to be removed. Each panel assembly includes a guarded high temperature resistant peripheral seal assembly for insuring that the flow of high temperature exhaust gases within the exhaust path is solely through the catalyst passages thereof.

19 Claims, 8 Drawing Sheets

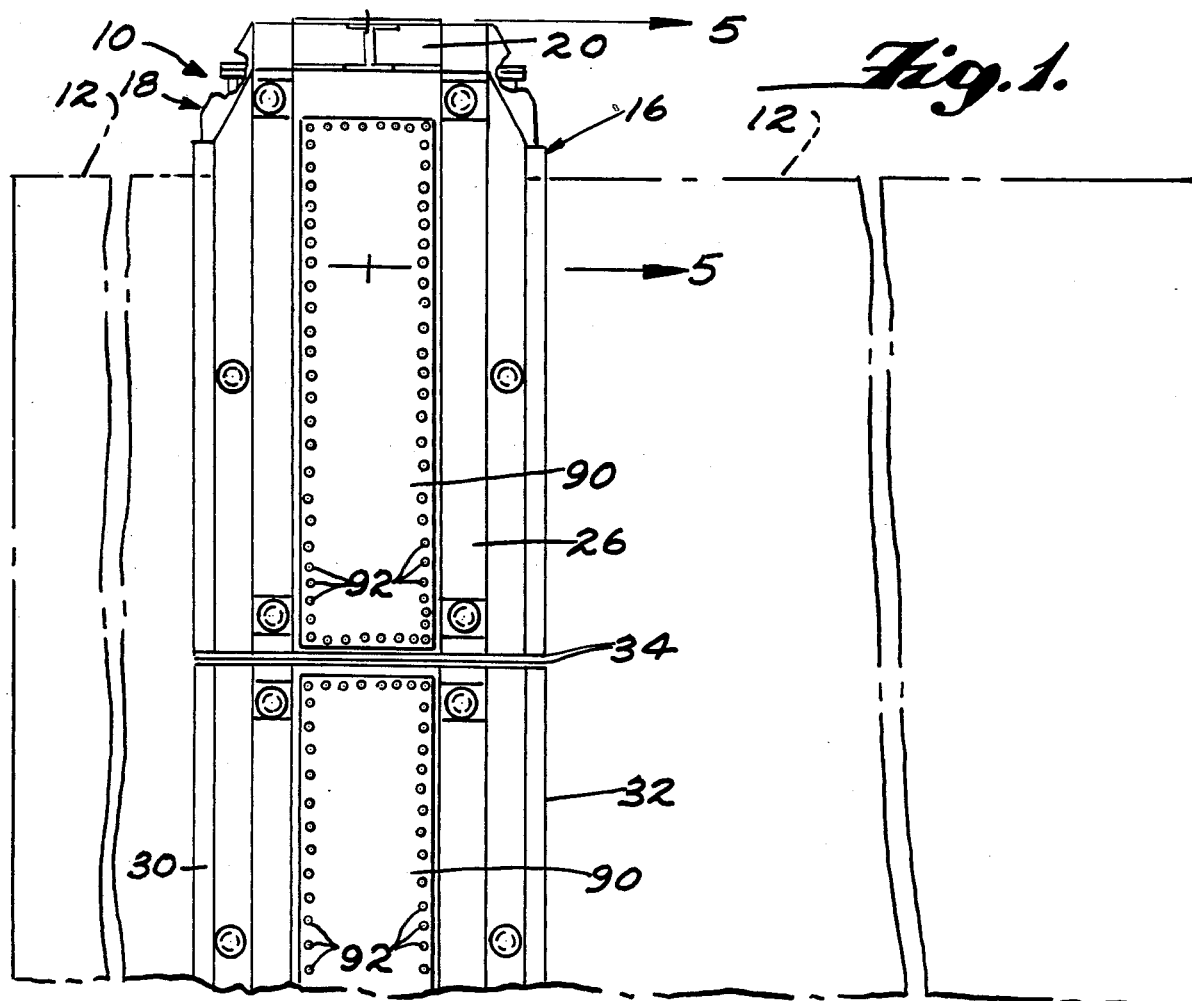
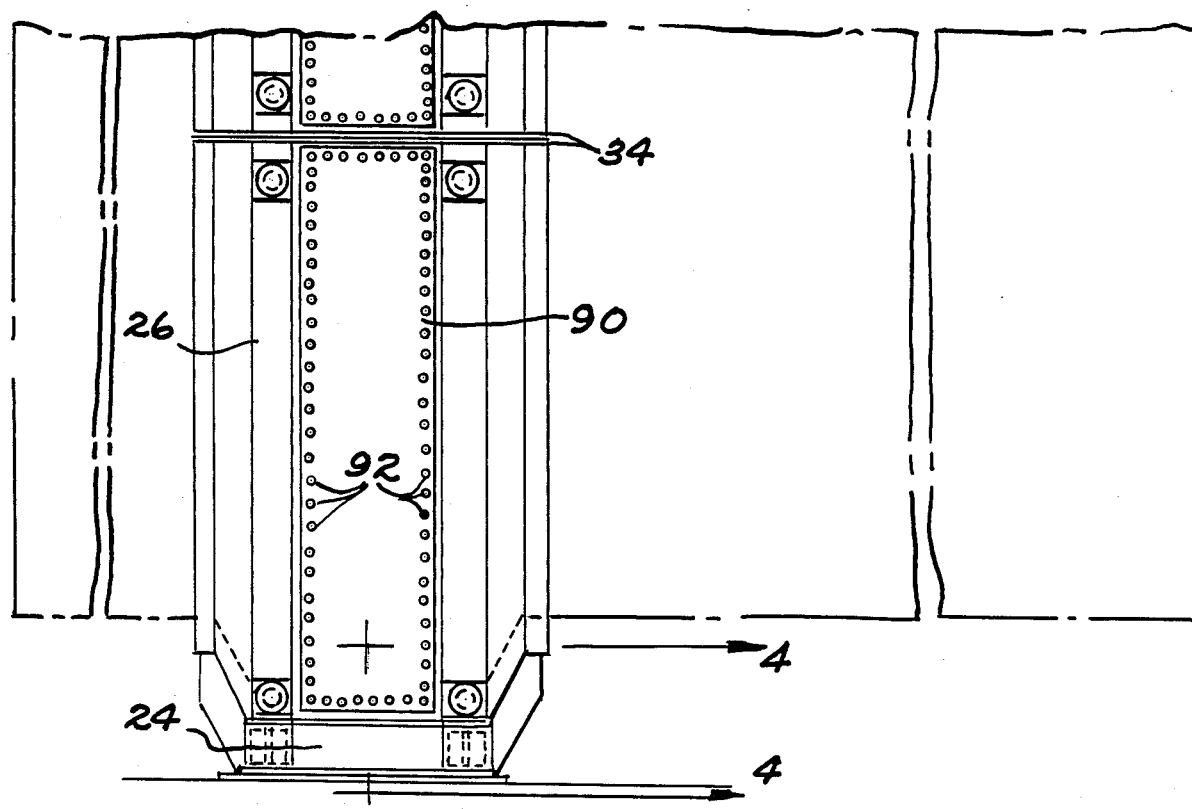
Fig. 1.

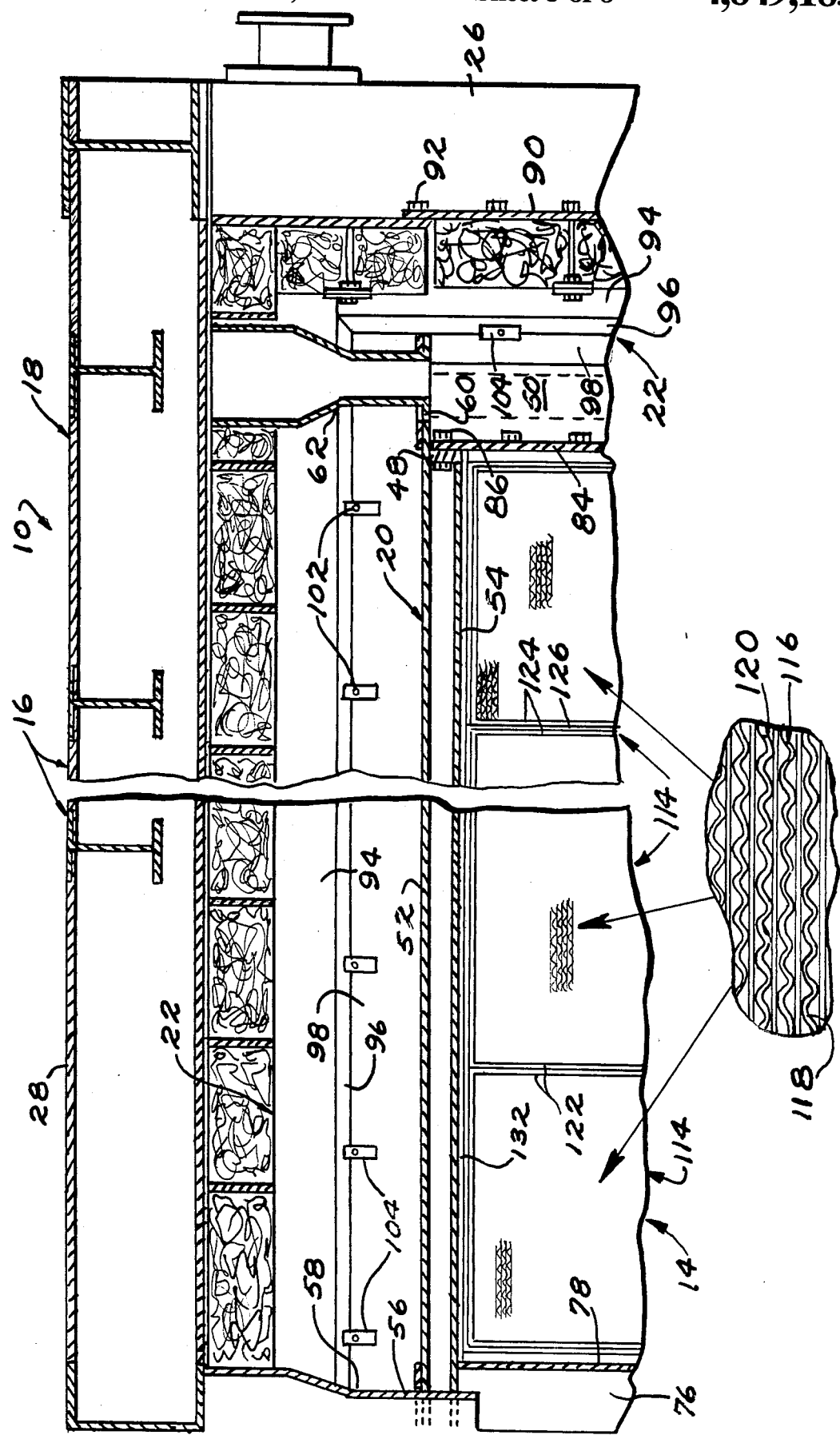

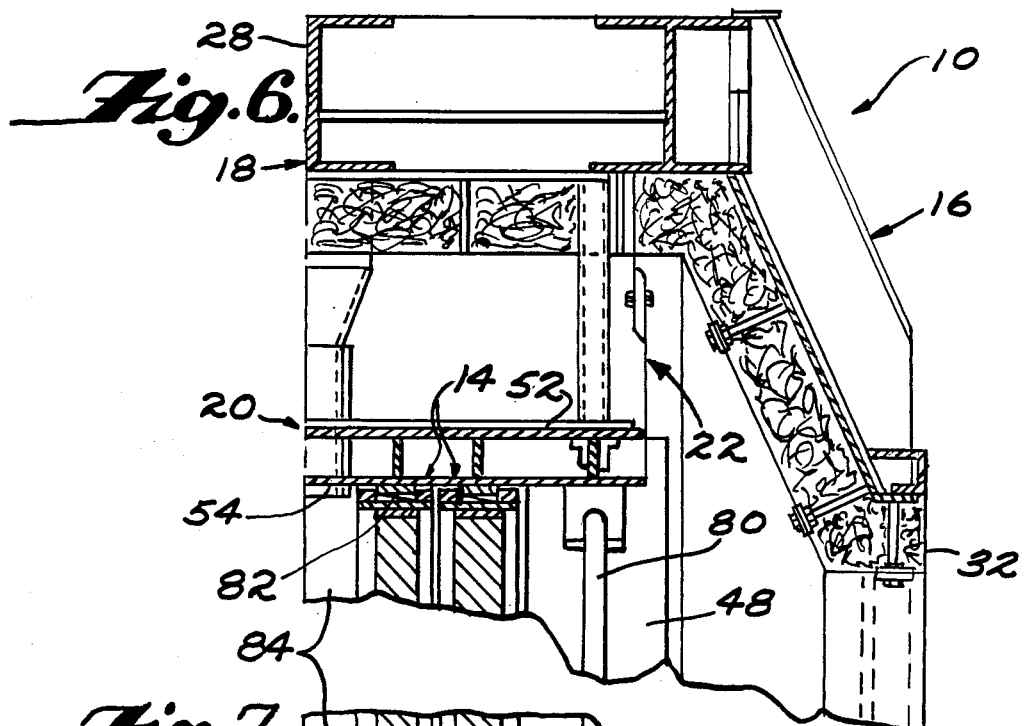
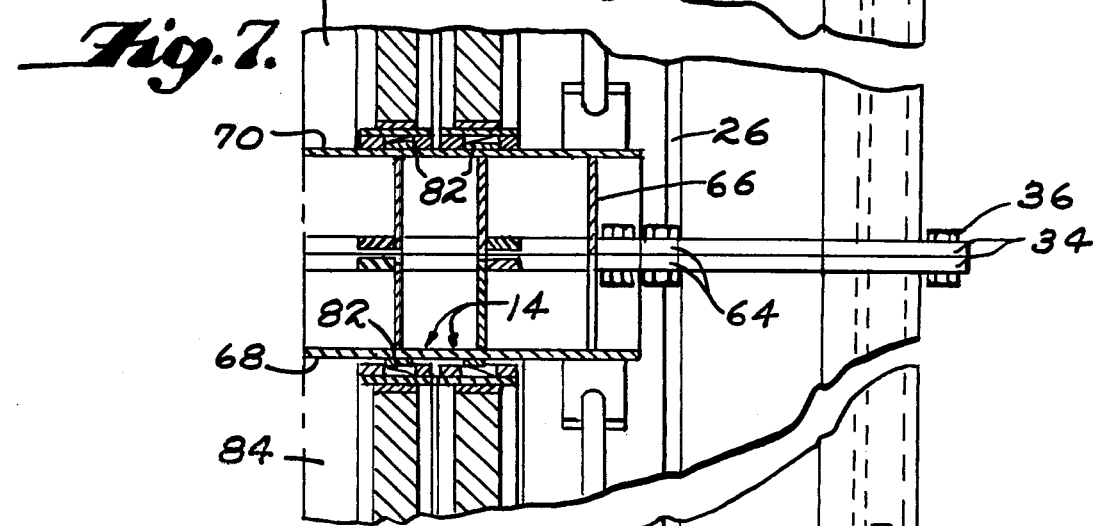
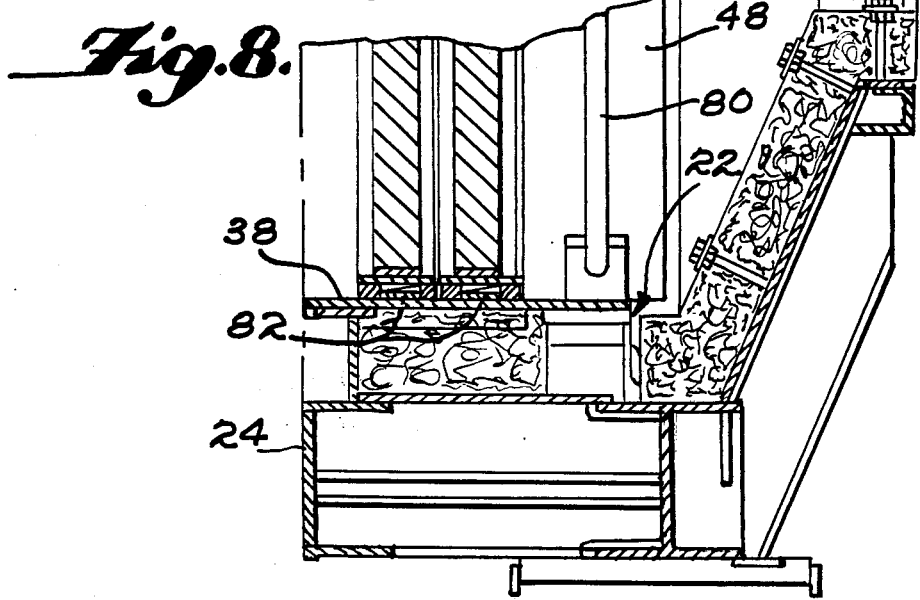

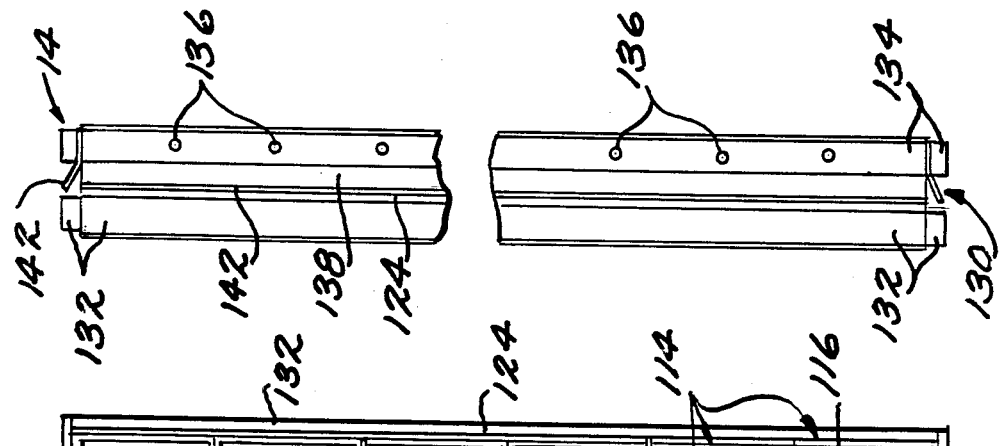
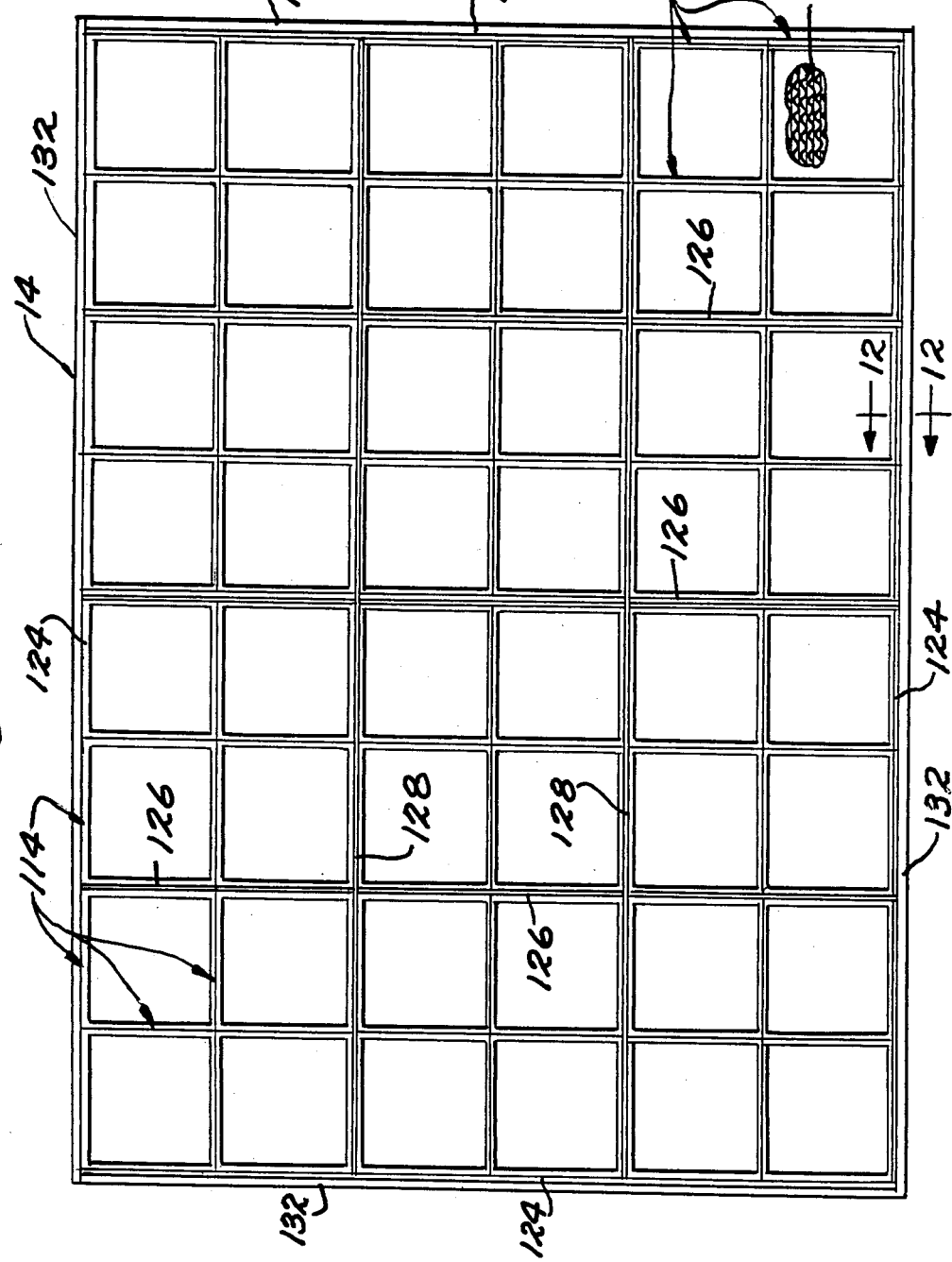

CATALYTIC CONVERTER WITH MULTIPLE REMOVABLE CATALYST PANELS

This invention relates to catalytic converters and more particularly to industrial style catalytic converters adapted to effect a catalytic treatment of a large volume exhaust gas flow.

The type of industrial catalytic converter installation herein contemplated is many times larger than the typical automobile type catalytic converter which most people are familiar with. For example, the present application contemplates the utilization of a basic catalyst block unit which has an area coverage dimension of approximately 2 feet by 2 feet or approximately 3.8 square feet. In the embodiment herein disclosed there are 1,152 of such units utilized in the entire installation. Consequently, the problems which are presented in undertaking to provide units of this volume are quite different from those which are presented in the automobile vehicle environment. One example of a large volume industrial installation is disclosed in U.S. Pat. No. 2,718,460 dated Sept. 20, 1955. In the assembly shown in this patent, the catalytic units are stacked in horizontal tiers so that the flow of exhaust gases is vertically through the tiers. The arrangement suffers from the disadvantage that since the tiers are built one upon the other it is difficult to service individual units as distinguished from the entire assembly.

U.S. Pat. No. 4,322,386 discloses an assembly which purports to deal with the problem of individual unit servicing. In the arrangement of this patent, the units are assembled together in individual assemblies which are mounted on rollers and adapted to be moved on such rollers into and out of the entire assembly which extends horizontally for vertical flow of gases therethrough.

The requirement to provide for vertical flow through the catalytic assembly materially increases the size of the installation since almost invariably the exhaust path extends in a horizontal direction so that less space and material is required if the assembly can be mounted vertically for the flow of gases horizontally therethrough. Heretofore, vertical installations have been limited in size and have been of the rigid type where all of the units are welded in place necessitating laborious procedures where servicing of one or more of the units is necessary. U.S. Pat. No. 4,238,455 proposes a somewhat modified vertical installation. Instead of one unitary bed where the entire set of catalyst block units are interengaged, the arrangement of this patent provides for separate columns of individual units which are arranged in a fashion similar to the bed arrangments. That is, the units of each column are interengaged one on top of the other. This means that, in order to access the bottom unit of a column, all of the units of that column must be removed.

It is an object of the present invention to provide a catalytic converter assembly embodying a multiplicity of catalyst panel assemblies and a panel support assembly which is capable of removably receiving and supporting each panel assembly by providing catalytic units which are capable of independent separate removal, a flexibility in operation is achieved which was heretobefore not possible. Moreover, the downtime required to replenish the entire arrangement is substantially reduced. One of the fundamentals in achieving individual catalyst unit removal is that the shape of each unit must be such that the dimensions extending transverse to the flow of the gas are maximized. Moreover, in order to make such units capable of simple handling, the overall volume must be controlled by insuring that the dimensions of the unit in the direction of flow is substantially less than the transverse dimensions.

With the above in mind, the above objectives are achieved in accordance with the principles of the present invention by providing an apparatus for effecting high temperature catalytic conversion treatment of exhaust gases flowing in a large volume exhaust path of an industrial installation which comprises a plurality of separate generally similarly constructed catalyst panel assemblies, and a panel support assembly arranged to be mounted within an exhaust path so as to define a portion of such an exhaust path and to separately removably support each of the plurality of catalyst panel assemblies so that high temperature exhaust gases within the exhaust path portion will flow therethrough in operation and each panel assembly can be conveniently serviced by simple removal. Each of the catalyst panel assemblies comprises a peripheral panel frame structure of generally rectangular configuration having four sides defining a central area, a plurality of catalyst blocks each providing passages for the flow of exhaust gases therethrough, and catalyst carried by the blocks in a position to contact gases flowing through the passages. The panel frame structure supports the plurality of blocks in side-by-side relation within the central area so that the passages of the side-by-side blocks provide the sole gas flow path through the central area of the panel frame structure. The axial extent of the passages are substantially less than either of the side-to-side measurements of the rectangular panel frame structure. The panel support assembly defines a plurality of side-by-side panel receiving spaces, each of a size and shape to support a plurality of panel assemblies in coextensive axially spaced operative positions therein. The spaces are defined by structure associated with each space which functions to confine three of the four sides of the panel assemblies supported therein. Movable doors are associated with the spaces which are openable to permit each of the plurality of catalyst panel assemblies associated therewith to be moved in and removed from their respective operative positions and closable to confine the fourth side of the associated plurality of catalyst panel assemblies in their respective operative positions within the associated space.

Another object of the present invention is to provide a removable catalyst panel assembly of the type described which is provided with an exterior peripheral frame structure formed with pairs of peripheral guard elements between which is mounted an inwardly yieldable high temperature resistant metal seal assembly.

Another object of the present invention is the provision of apparatus of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS:

FIG. 1 is a side elevational view of the apparatus for effecting high temperature catalytic conversion treatment of exhaust gases embodying the principles of the present invention showing the large volume exhaust path in phantom lines which serves to direct the flow of high temperature exhaust gases through the apparatus;

FIG. 5 is an enlarged fragmentary view similar to FIG. 4 taken along the line 5—5 of FIG. 1;

FIG. 6 is a view similar to FIG. 4 taken along the line 6—6 of FIG. 2;

FIG. 7 is a view similar to FIG. 4 taken along the line 7—7 of FIG. 2;

FIG. 8 is a view similar to FIG. 4 taken along the line 8—8 of FIG. 2;

FIG. 10 is a front elevational view of a catalyst panel assembly embodying the principles of the present invention forming a part of the apparatus shown in FIG. 1;

FIG. 11 is an enlarged end view of the panel assembly shown in FIG. 10, and

Figure 2:
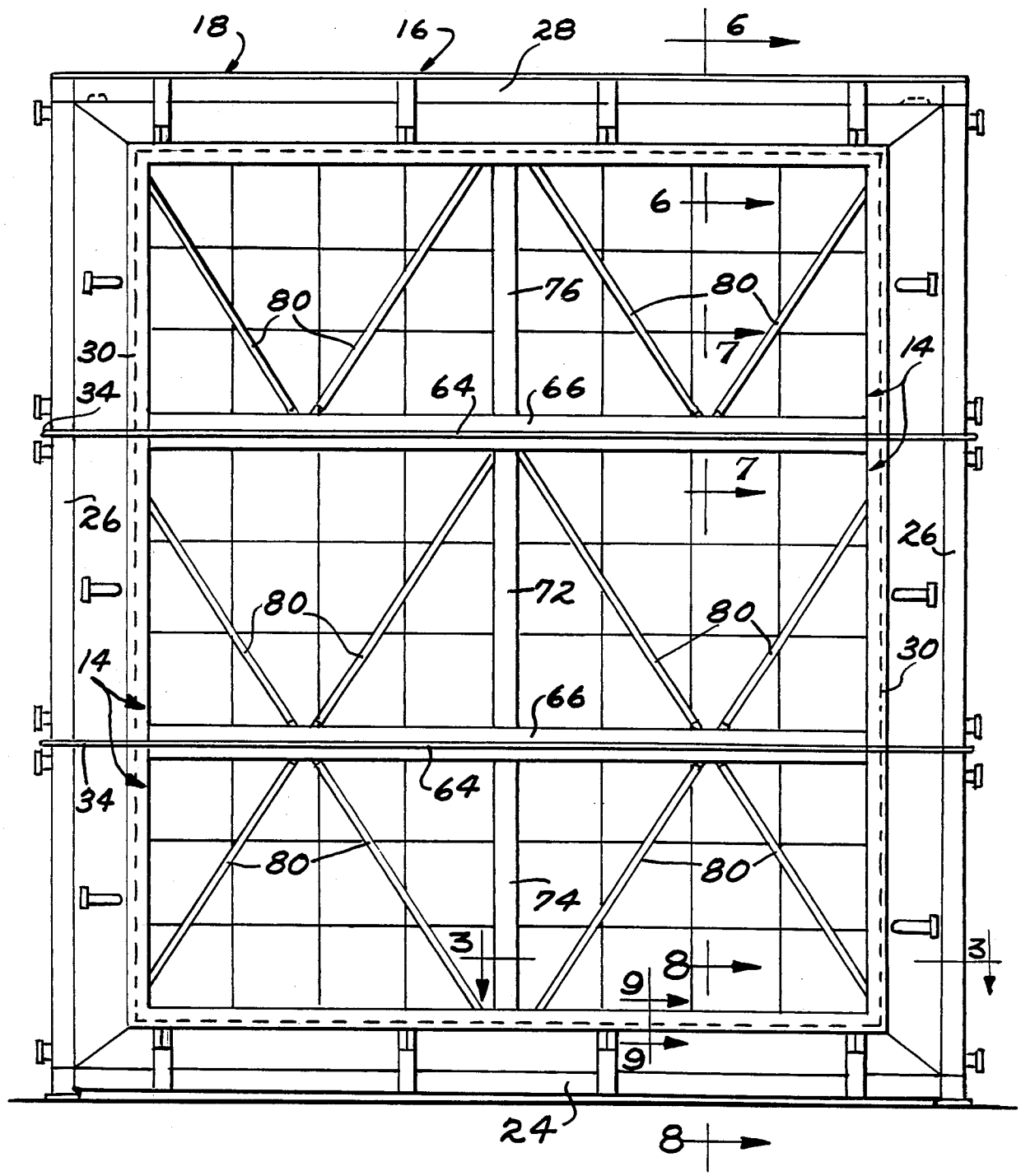
FIG. 2 is a front elevational view of the apparatus shown in FIG. 1.

Referring now more particularly to the drawings, there is shown in FIG. 1 thereof an apparatus, generally indicated at 10, for effecting high temperature catalytic conversion treatment of exhaust gases flowing in a large volume exhaust path, the apparatus being constructed in accordance with the principles of the present invention. The exhaust path is indicated generally by the reference numeral 12 and by phantom lines in FIG. 1. As shown, the large volume exhaust path 12 confines the high temperature exhaust gases to flow in a horizontal direction. The apparatus 10 is oriented vertically so as to effect high temperature catalytic conversion treatment of the exhaust gases flowing horizontally therethrough.

The apparatus 10 includes in general a plurality of separate catalyst panel assemblies, generally indicated at 14, and a panel support assembly, generally indicated at 16, arranged to be mounted within the exhaust path 12 and to separately removably support each of the plurality of catalyst panel assemblies 14 so that the high temperature exhaust gases within the exhaust path 12 will flow horizontally therethrough in operation and each panel assembly 14 can be conveniently serviced by simple removal.

The panel support assembly 16 comprises an outer ambient temperature peripheral frame structure, generally indicated at 18, and an inner high temperature peripheral frame structure, generally indicated at 20, carried by the outer peripheral frame structure 18 for temperature responsive expansion and contraction with respect thereto. Mounted between the outer peripheral frame structure 18 and the inner peripheral frame structure 20 is an expansible and contractible seal assembly, generally indicated at 22, which serves to provide a seal against the flow of exhaust gases between the two frame structures while at the same time accommodating the aforesaid temperature responsive expansion and contraction of the inner peripheral frame structure 20 with respect to the outer peripheral frame structure 18.

The outer peripheral frame structure 18, as shown, is of generally rectangular configuration and is preferably oriented vertically, as shown, so as to be connectable in the duct or between the duct sections defining the horizontal exhaust path 12. The outer peripheral frame structure 18 may be of any desirable construction. As shown, it is a welded structure formed from sheet stock, angle irons and the like, and a layer of suitable insulating material inwardly of the sheet stock so as to insure to the extent possible that the frame structure will remain at ambient temperature. As shown, the outer frame structure includes a bottom frame section 24 and two upwardly extending vertical side frame sections 26 extending upwardly from the ends of the bottom frame section 24. The upper ends of the side frame sections 26 are fixedly interconnected by a top frame section 28. An inlet duct transition peripheral section 20 is connected to the forward edges of the bottom, side and top sections and an outlet duct connecting section 32 is connected to the trailing edges of the bottom, side and top sections.

For purposes of transporting the outer peripheral frame structure from a position of fabrication to a position of installation, the side frame sections 26, each of which includes spaced hollow column members, are divided horizontally into a plurality of vertically stacked side frame portions. As shown, there are three such portions provided and the severed ends have attaching plates 34 welded thereto which extend beyond the periphery so as to provide marginal portions for the receipt of bolts 36 operable to secure the pairs of attaching plates 34 in abutting relation. (See FIG. 7)

Figure 3:
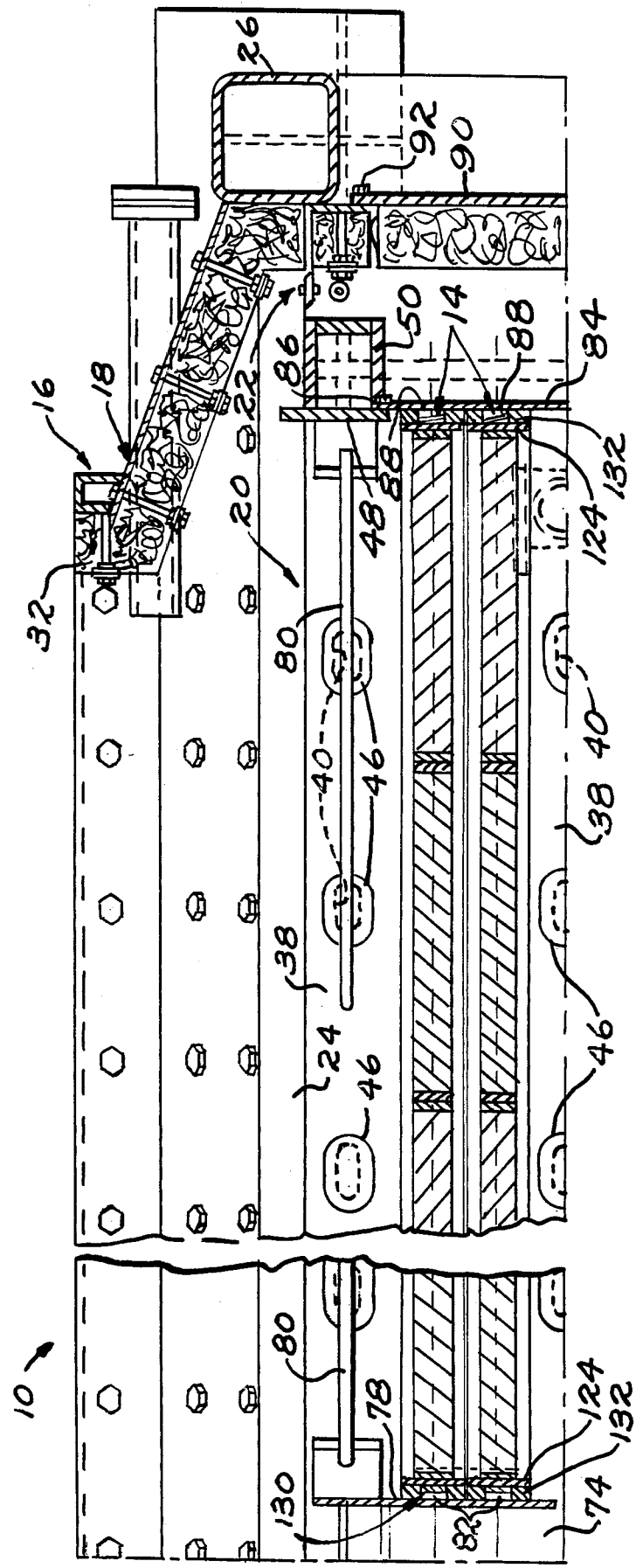
FIG. 3 is an enlarged fragmentary sectional view taken along the line 3—3 of FIG. 2, the fragment shown being a symmetrical quadrant.
Figure 4:
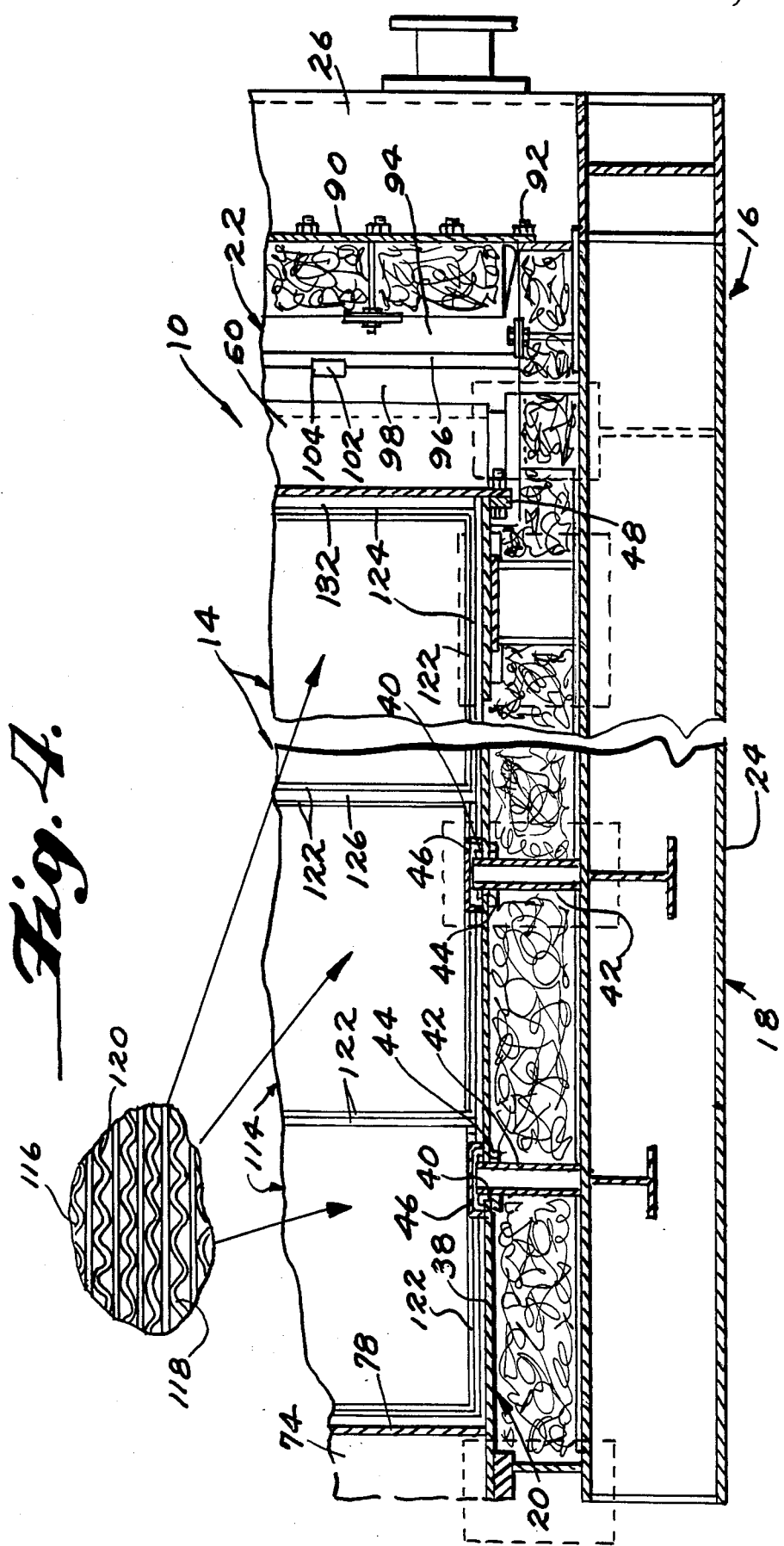
FIG. 4 is an enlarged fragmentary section view taken along the line 4—4 of FIG. 1, the fragment shown being a symmetrical half.

The inner peripheral frame structure 20 includes interior bottom frame member 38. The central portion of the bottom frame member 38 is fixed to the central portion of the bottom frame section 24 of the outer peripheral frame structure 18. As best shown in FIGS. 3 and 4, the interior bottom frame member 38 is formed with a series of openings 40. The openings 40 receive the upper ends of tubes 42 therein which form a part of the bottom frame section 24. Each tube 42 has welded to the upper exterior thereto a plate 44 which is of a size larger than the associated opening 40. The interior frame member 38 is thus supported for temperature responsive expansion and contraction horizontally outwardly from the central portion thereof by virtue of the sliding support provided by the plates 44. As best shown in FIG. 3, the interior bottom frame member 38 has welded thereto a series of caps 46 which cover the upper ends of the tubes 42 and provide the appropriate airtight seal.

The inner peripheral frame structure 20 also includes inner side frame sections 48 extending upwardly from opposite ends of the interior bottom frame member 38. Preferably each side frame section 48 includes a pair of spaced hollow vertical extending columns 50. The inner peripheral frame structure 20 also includes a top frame section 52 which is of welded beam construction and which provides an interior top frame member 54. As best shown in FIG. 5, the central portion of the top frame section 52 is formed with a vertical aperture 56 for receiving the lower end of a tubular central stabilizer 58 fixedly carried by the top frame section 28 of the outer peripheral frame structure 18. The arrangement is such as to stabilize the interior top frame section 52 against horizontal movement while accommodating temperature responsive vertical expansion and contraction. At the central portion of each end of the top frame section 52, a relatively large vertical opening 60 is provided for receiving the lower end of a tubular end stabilizer 62. The arrangement is such as to stabilize the associated end of the top frame section 52 against horizontal movement in the direction of flow while accommodating temperature responsive expansion and contraction horizontally in a direction outwardly of the central stabilizer 58, as well as vertically.

The side frame sections 48 of the inner peripheral frames structure 20 are horizontally divided for purposes of transportation facilitation, like outer side sections 26, and also to divide the interior space defined by the inner peripheral frame structure 20 into a plurality of vertically stacked spaces. As best shown in FIG. 2, three vertically stacked spaces are provided. As before, the severed ends of the plurality of side frame portions formed by dividing the side frame sections 48 horizontally are welded to bolted mounting plates 64 which form a part of an intermediate interior horizontal frame section 66.

As best shown in FIG. 7, each intermediate horizontal frame section 66 includes a lower horizontal frame member 68 and an upper horizontal frame member 70. Fixedly secured between the central portions of the lower horizontal frame member 68 and the upper horizontal frame member 70 of the two intermediate horizontal frame sections 66 is a central intermediate vertical frame section 72. As best shown in FIG. 2, a lower intermediate vertical frame section 74 is similarly fixed between the bottom frame member 38 and the lower frame member 68 of the lowermost intermediate horizontal frame section 66 and an upper intermediate vertical frame section 76 is fixed between the top frame member 54 and the upper frame member 70 of the uppermost intermediate horizontal frame section 66. The vertical intermediate frame sections 72, 74 and 76 divide the three vertically stacked spaces into six spaces.

Each of the three intermediate vertical frame sections provide a pair of oppositely facing vertical side frame members 78. Each of the six vertical side frame members 78 defines an interior side of a panel receiving space, the top of which is defined either by the associated top frame member 54 or lower horizontal frame member 68 and the bottom of which is defined either by the associated bottom frame member 38 or upper horizontal frame member 70. Each of the panel receiving spaces opens outwardly through the exterior side opposite from the side frame member 78 and, specifically, between the associated two side portions of the columns 50. As best shown in FIG. 2, the interior peripheral frame members which define the six spaces are braced by a series of forward and rearward diagonal brace members 80.

The interior frame members 38, 54, 68, 70 and 78 defining the six panel receiving spaces are each provided with a series of four elongated horizontally spaced panel retaining elements 82. The exterior open side of each panel receiving space is closed by a door member 84 fixed to the associated side frame structure 48, as by bolts 86 or the like. Each door member 84 constitutes a final interior side frame member which, with the associated other three, serves to mount a catalytic panel assembly 14 in the associated space. To this end, each door member 84 has fixedly mounted on the interior surface thereof a corresponding series of four spaced elongated panel retaining elements 88, see FIG. 3. As best shown in FIGS. 1, 3, 4, and 5, the outer side wall frame sections 26 of the outer peripheral frame structure 18 are provided with six corresponding insulated door members 90 which are suitably detachably fixed in position, as by bolts 92 or the like.

Figure 9:
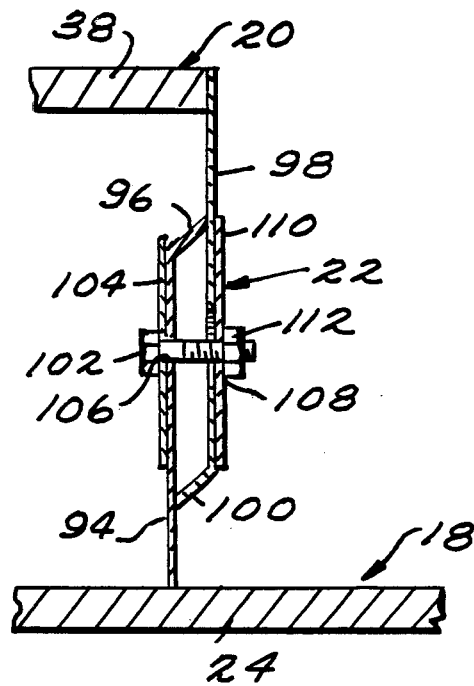
FIG. 9 is a fragmentary detailed sectional view taken along the line 9—9 of FIG. 2.

Referring now more particularly to FIG. 9, the expansible and contractible peripheral seal assembly 22 is illustrated in cross-sectional detail therein. The view shown therein is taken along the bottom frame sections of the outer and inner peripheral frame structures 18 and 20 respectively. It will be understood that the cross-sectional configuration of the seal assembly 22 is similar along the side frame sections of the two frame structures and along the top frame sections as well. The arrangement is such that the cross-sectional configuration is similar throughout except that the amount of expansion and contraction which must be accommodated is greater along the top than along the bottom and varies along the sides. Moreover, it will be understood that there is a seal assembly 22 both at the upstream side of the two frame structures as well as at the downstream side thereof.

With the above in mind, it will be noted that the peripheral seal assembly 22 includes an outer peripheral plate-like seal element 94 which is fixed at one end, as by welding or the like, to the other peripheral frame structure 18 and extends radially inwardly therefrom and terminates in an angular sealing edge 96. The seal assembly 22 also includes an inner peripheral seal element 98 which is fixed, as by welding or the like, to the inner peripheral frame structure 20 and extends radially outwardly therefrom in spaced parallel relation with the outer peripheral seal element 94. The inner peripheral seal element 98 also terminates in an angular sealing edge 100 similar to the sealing edge 96 of the outer peripheral seal element 94. These two sealing edges are disposed and retained in slidable sealing relation to the associated seal elements, by a series of bolt assemblies including bolts 102. The head of each bolt 102 engages a washer plate 104 which, in turn, engages the outer peripheral seal element 94 on the exterior surface thereof. Each bolt 102 extends through an associated opening 106 in the outer seal element 94 and through a larger hole 108 formed in the inner peripheral seal element 98. It will be understood that the holes 108 get progressively larger in a horizontal direction outwardly from the center of the bottom and top sections of the inner peripheral seal element 98 and progressively increase in vertical dimension along the side sections thereof from bottom to top. A second washer 110 is fixed exteriorly of each larger opening 108 to seal the same. Each bolt assembly includes a nut 112 threadedly engaged on an associated bolt 102 in engagement with an associated second washer 110. The arrangement is such that the washers 104 and 110 prevent the passage of gases through the openings 106 and 108 while the peripheral sealing egdes 96 and 98 engaging with the sealing elements 98 and 94, respectively, prevent flow of gas between the two peripheral seal elements. The arrangement is such as to compensate for temperature responsive expansion and contraction of the inner peripheral frame structure 20 with respect to the outer peripheral frame structure 18 by the aforesaid sliding seal arrangement.

Figure 12:
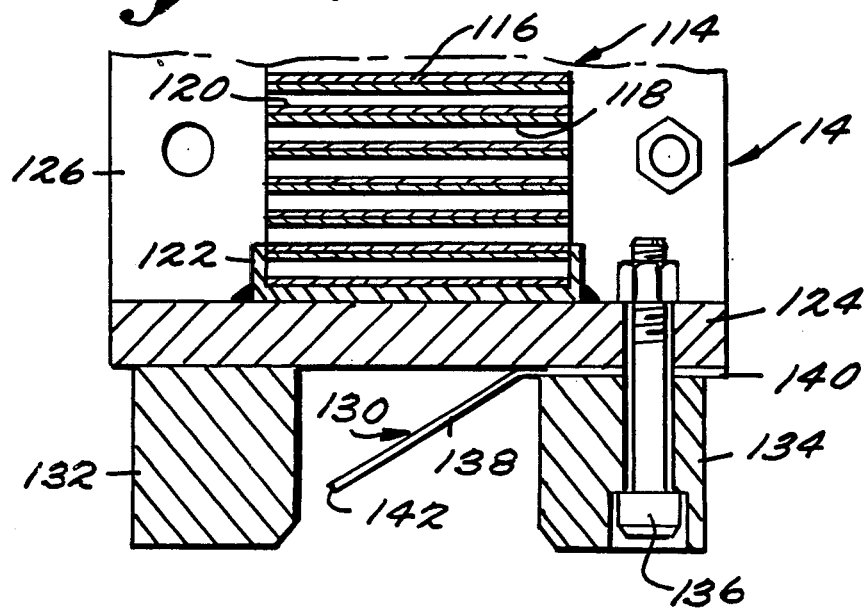
FIG. 12 is an enlarged detailed sectional view taken along the line 12—12 of FIG. 10.

Referring now more particularly to FIGS. 10 through 12, the construction of one of the multiplicity of catalyst panel assemblies 14 will now be described, it being understood that all of the other ones are of similar construction. As shown, the catalyst panel assembly 14 is formed from a multiplicity of catalyst block units, generally indicated at 114. Each catalyst block unit 114 consist of a catalyst block 116 which may be of any known configuration. For example, each catalyst block 116 may be of honeycomb cross sectional configuration formed from alternating flat and corrugated metal alloy plates providing a multiplicity of passages 118 through which exhaust gases may flow. A catalyst 120 (e.g. platinum-rhodium alloy) is adhered to the surface of the catalyst block 116 so as to engage with and interreact with gases flowing through the passages 118. As best shown in FIG. 12, each block 116 is encased within a peripheral frame 122 of channel shaped cross-sectional configuration. The catalyst block units 114 are fixed together in clusters of four by an exterior peripheral frame structure consisting of four side frame members 124 and vertical and horizontal interior frame members 126 and 128, respectively. The frame members 124, 126 and 128 are suitably welded to each other and to the frames 122 of the block units 114.

The elongated elements 82 affixed to the interior side frame members of the inner peripheral frame structure 20 function as a part of a cooperating support means for removably supporting the multiplicity of catalyst panel assemblies 14 within the panel support assembly 16. As shown, the exterior frame members 124 of each catalyst panel assembly 14 is provided with cooperating support means includes a remaining cantilevered angular sealing portion 142 which is disposed wholly between the associated guard elements 132 and 134. The angular position of the marginal seal portion 142 of each seal plate 138 is such as to engage the associated surface of the associated elongated element 82 and 88 when the panel assembly 14 is disposed in operative position. It will also be noted that the upper and lower associated pairs of elongated elements 82 serve as tracks for enabling the upper and lower pairs of guard elements 132 and 134 of each panel assembly 14 to be guidingly moved horizontally into an associated space with a horizontal sliding movement. During this movement, the upper and lower seal portions 142 engage the surfaces of the associated elongated elements 82 and are deflected inwardly. When the panel assembly 14 reaches its operative position, the vertical elongated element 82 carried by the associated vertical side frame member 78 engages the associated cantilevered spring seal portion 142. Finally, when the associated door member 84 is moved into position, the associated elongated element 88 thereof is likewise moved between the associated guard elements 132 and 134 and into flexing engagement with the associated spring seal portion 142. It will be noted that the interengagement of the elongated elements 82 and 88 with the guard elements 132 and 134 provide for a certain amount of blockage of the flow of gas between the exterior periphery of each catalyst panel assembly and the associated interior side frame members of the panel support assembly. Nevertheless, the flow of gas is such that it will impinge upon the surface of each spring seal portion 142 in such a way as to tend to increase its sealing engagement with the associated elongated element 82 or 88.

It can be seen that the apparatus 10 of the present invention provides a highly effective means of presenting catalyst to a gas flow in such a way as to engage and interact with the gas and establish an effective catalytic conversion action. The apparatus 10 is particularly effective in dealing with large volume of exhaust gas flow. The removability of the panel assemblies, while at the same time maintaining a substantial airtight seal against leakage of gas through paths other than the catalyst block passages is a particularly desirable feature because it enables the apparatus to be serviced periodically with minimum down time.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Apparatus for effecting high temperature catalytic conversion treatment of exhaust gases flowing in a large volume exhaust path of an industrial installation comprising a plurality of separate generally similarly constructed catalyst panel assemblies, and a panel support assembly arranged to be mounted within an exhaust path so as to define a portion of such an exhaust path and to separately removably support each of said plurality of catalyst panel assemblies so that high temperature exhaust gases within the exhaust path portion will flow therethrough in operation and each panel assembly can be conveniently serviced by simple removal, each of said catalyst panel assemblies comprising a peripheral panel frame structure of generally rectangular configuration having four sides defining a central area, a plurality of catalyst blocks each providing passages for the flow of exhaust gases therethrough, catalyst means carried by said blocks in a position to contact gases flowing through said passages, and means fixed to said panel frame structure for supporting said plurality of blocks in side-by-side relation within said central area so that the passages of the said side-by-side blocks provide the sole gas flow path through the central area of the panel frame structure, the axial extent of said passages being substantially less than either of the side-to-side measurements of said rectangular panel frame structure, said panel support assembly including means defining a plurality of side-by-side panel receiving spaces, each of a size and shape to support a plurality of panel assemblies in coextensive axially spaced operative positions therein, said space defining means including fixed means associated with each space for confining three of said four sides of the panel assemblies supported therein and movable door means associated with each space openable to permit each of the plurality of catalyst panel assemblies associated therewith to be moved in and removed from their respective operative positions and closable to confine the fourth side of the associated plurality of catalyst panel assemblies in their respective operative positions within the associated space.

2. Apparatus as defined in claim 1 wherein said panel support assembly comprises an outer peripheral frame structure for exposure to ambient temperature conditions, an inner peripheral frame structure for exposure to the high temperature exhaust gas conditions mounted within said outer peripheral frame structure for temperature responsive expansion and contraction with respect to said outer frame structure, and expansible and contractible high temperature resistant peripheral seal means between the inner and outer peripheral frame structures for maintaining a flow preventing seal between said inner and outer peripheral frame structures.

3. Apparatus as defined in claim 2 wherein said outer peripheral frame structure is rectangular and disposed vertically in operation so that exhaust gases flow horizontally therethrough in operation.

4. Apparatus as defined in claim 3 wherein each panel frame structure is rectangular and includes pairs of exterior vertical and horizontal side frame members, each exterior side frame member having a pair of elongated guard elements fixed along the exterior thereof in spaced relation in the direction of gas flow, said inner peripheral frame structure including pairs of interior horizontal and vertical frame members each having an elongated panel retaining element therealong disposed between an associated pair of guard elements when the associated panel assembly is in its operative position.

5. Apparatus as defined in claim 4 wherein each interior side frame member has a plurality of panel retaining elements fixed thereto spaced in the direction of gas flow so as to receive and retain a corresponding plurality of panel assemblies correspondingly oriented.

6. Apparatus as defined in claim 4 wherein cooperating high temperature resistant peripheral seal means is provided between the exterior periphery of each panel frame structure and said door means and said inner peripheral frame structure, said cooperative seal means comprising a yieldable thin metal seal plate extending throughout and between the pairs of guard elements along each exterior side frame member of each panel assembly, and surface means on the associated panel retaining element sealingly engaging said seal plate in yielding relation in a direction such that the flow of gases tends to intensify the sealing engagement.

7. Apparatus as defined in claim 6 wherein one of the pair of guard elements on each exterior side frame member of each panel assembly is removably fixedly mounted thereon, the associated seal plate being in the form of an elongated strip providing a mounting portion along one marginal edge which is disposed at an angle to the remaining portion thereof, each strip mounting portion being removably fixedly mounted between the associated removably fixedly mounted guard element and the associated exterior side frame member.

8. Apparatus as defined in claim 3 wherein said inner peripheral frame structure is also rectangular and vertically oriented in operation, said inner peripheral frame structure including a horizontal bottom frame section, a pair of vertical side frame sections extending upwardly from opposite ends of said horizontal bottom frame section, and a horizontal top frame section connected between the upper ends of said vertical side frame sections, means for supporting said horizontal bottom frame section on said outer frame structure so that the central portion thereof is fixed and opposite end portions thereof are capable of progressively outwardly increasing horizontal temperature responsive expansion and contraction, means for supporting the lower end of each vertical side frame section for horizontal temperature responsive expansion and contraction with the associated end of said horizontal bottom frame section, means between said outer peripheral frame structure and the central portion of said horizontal top frame section accommodating vertical temperature responsive expansion and contraction thereof while stablizing the same against horizontal movement in any direction, means between said outer peripheral frame structure and the juncture between the upper end of each vertical side frame section and the associated end of the horizontal top frame section accommodating vertical and horizontal temperature responsive expansion and contraction in the longitudinal direction of extent of said horizontal top frame section while stabilizing the same against movement in a horizontal direction transverse thereto.

9. Apparatus as defined in claim 8 wherein each vertical side frame section includes a pair of hollow tubular columns spaced apart horizontally in the direction of gas flow.

10. Apparatus as defined in claim 8 wherein said vertical side frame sections are divided into a plurality of detachably fixed mounted side frame portions disposed in end to end abutting relation and said inner peripheral frame structure includes a detachably fixedly mounted abutting intermediate horizontal frame sections having opposite ends fixedly secured to associated abutting ends of associated vertical side frame portions respectively.

11. Apparatus as defined in claim 10 wherein said inner peripheral frame structure further includes an intermediate vertical frame portion fixed between the central portion of successive horizontal frame sections.

12. Apparatus as defined in claim 11 wherein said inner peripheral frame structure further includes a pair of vertically spaced horizontal interior frame members adjacent to and between each successive pair of horizontal frame sections on opposite sides of the associated intermediate vertical frame portion for slidably receiving a panel assembly horizontally therebetween and a vertical interior frame member between the inner ends of each pair of horizontal interior frame members adjacent the associated intermediate vertical frame portion.

13. Apparatus as defined in claim 13 wherein said door means includes a separate vertical interior door frame member removably fixedly mounted between the outer ends of each pair of horizontal interior frame members.

14. Apparatus as defined in claim 13 wherein said door means further includes a separate exterior door member removably fixedly mounted on said outer peripheral frame structure in a position outwardly of each interior door frame member.

15. Apparatus as defined in claim 13 wherein each pair of horizontal interior frame members includes a plurality of cooperating pairs of elongated horizontal panel retaining elements spaced apart in the direction of gas flow for slidably receiving therebetween a corresponding plurality of correspondingly oriented panel assemblies.

16. Apparatus as defined in claim 15 wherein the vertical interior frame members associated with each pair of horizontal interior frame members include a correspondingly plurality of cooperating pairs of elongated vertical panel retaining elements.

17. Apparatus as defined in claim 16 wherein each panel frame structure is rectangular and includes pairs of exterior vertical and horizontal side frame members, each exterior side frame member having a pair of elongated guard elements fixed along the exterior thereof in spaced relation so as to receive therebetween an associated panel retaining element when the associated catalyst panel assembly is in its operative position.

18. Apparatus as defined in claim 17 wherein cooperating high temperature resistant peripheral seal means is provided between the exterior periphery of each panel frame structure and said door means and said inner peripheral frame structure, said cooperative seal means comprising a yieldable thin metal seal plate extending throughout and between the pairs of guard elements along each exterior side frame member of each catalyst panel assembly, and surface means on the associated panel retaining element sealingly engaging said seal plate in yielding relation in a direction such that the flow of gases tends to intensify the sealing engagement.

19. Apparatus as defined in claim 18 wherein one of the pair of guard elements on each exterior side frame member of each catalyst panel assembly is removably fixedly mounted thereon, the associated seal plate being in the form of an elongated strip providing a mounting portion along one marginal edge which is disposed at an angle to the remaining portion thereof, each strip mounting portion being removably fixedly mounted between the associated removably fixedly mounted guard element and the associated exterior side frame member.

* * * * *